(12) United States Patent
Haverinen

(10) Patent No.: US 7,848,522 B2
(45) Date of Patent: *Dec. 7, 2010

(54) METHOD FOR AUTHENTICATING A USER IN A TERMINAL, AN AUTHENTICATION SYSTEM, A TERMINAL, AND AN AUTHORIZATION DEVICE

(75) Inventor: Henry Haverinen, Jyväskylä (FI)

(73) Assignee: Nokia Corporation, Espoo (FI)

( * ) Notice: Subject to any disclaimer, the term of this patent is extended or adjusted under 35 U.S.C. 154(b) by 1130 days.

This patent is subject to a terminal disclaimer.

(21) Appl. No.: 10/491,116

(22) PCT Filed: Sep. 27, 2002

(86) PCT No.: PCT/FI02/00769

§ 371 (c)(1),
(2), (4) Date: Mar. 26, 2004

(87) PCT Pub. No.: WO03/030445

PCT Pub. Date: Apr. 10, 2003

(65) Prior Publication Data

US 2004/0236964 A1 Nov. 25, 2004

(30) Foreign Application Priority Data

Sep. 28, 2001 (FI) .................... 20011909

(51) Int. Cl.
*H04K 1/00* (2006.01)
(52) U.S. Cl. ........................ 380/247; 713/168
(58) Field of Classification Search .............. 713/168; 380/247

See application file for complete search history.

(56) References Cited

U.S. PATENT DOCUMENTS

| 5,537,474 | A | 7/1996 | Brown et al. |
| 5,757,918 | A | 5/1998 | Hopkins |
| 6,721,793 | B1* | 4/2004 | Corless .................. 709/229 |
| 7,257,836 | B1* | 8/2007 | Moore et al. ................ 726/5 |
| 2003/0093680 | A1* | 5/2003 | Astley et al. ............. 713/183 |
| 2003/0204568 | A1* | 10/2003 | Bhargava et al. ......... 709/206 |
| 2004/0014422 | A1* | 1/2004 | Kallio .................... 455/41.1 |

(Continued)

FOREIGN PATENT DOCUMENTS

CN 1209939 A 3/1999

(Continued)

OTHER PUBLICATIONS

Blunk et al., PPP Extensible Authentication Protocol (EAP), RFC 2284, Mar. 1998, IETF.*

(Continued)

*Primary Examiner*—David García Cervetti
(74) *Attorney, Agent, or Firm*—Ware, Fressola, Van Der Sluys & Adolphson LLP

(57) ABSTRACT

The invention relates to a method for authenticating the user of a terminal (5), in which terminal a device (15) for verifying the rights to use is applied for running an authentication protocol. The device (15) for verifying the rights to use is connected to the terminal (5). In the device (15) for verifying the rights to use, an extensible authentication protocol interface is applied, via which at least some of the authentication functions are carried out.

19 Claims, 6 Drawing Sheets

U.S. PATENT DOCUMENTS

Figure 1:
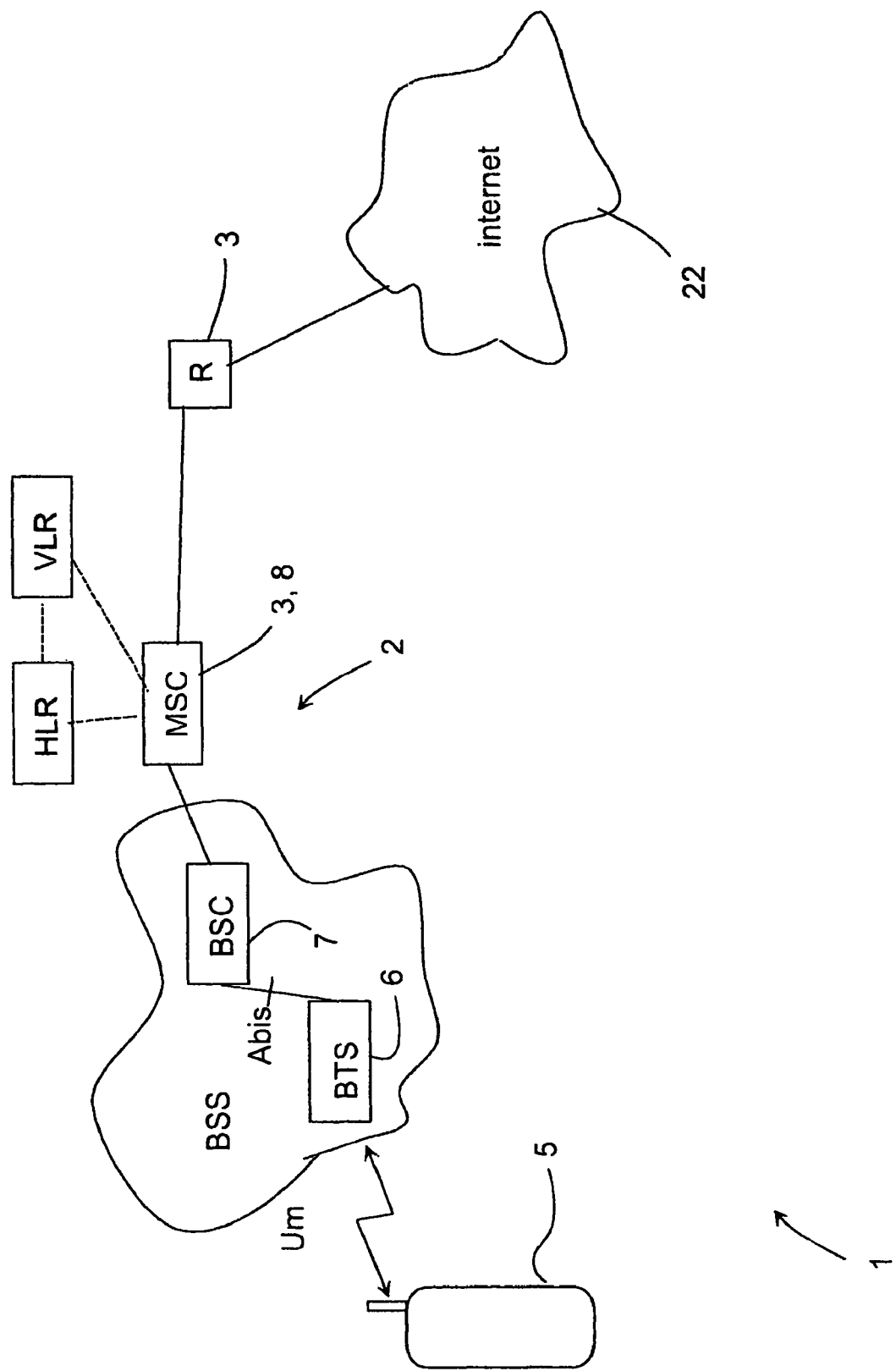

2004/0078571 A1* 4/2004 Haverinen ................ 713/168
2005/0066356 A1* 3/2005 Stone et al. ................ 725/31

FOREIGN PATENT DOCUMENTS

| EP | 1094682 | 4/2001 |
|---|---|---|
| JP | 9-266594 | 10/1997 |
| WO | 97/27716 | 7/1997 |
| WO | 0002406 | 1/2000 |
| WO | WO 01/18633 | 3/2001 |

OTHER PUBLICATIONS

"Use of GSM SIM Authentication in IEEE802.11 System" H. Haverinen et al, Submitted to IEEE802.11 TGe Jan. 2001, Slides 1-9.

Chinese Office Action for Chinese Application No. 02819228.1 (PCT/FI02/00769), dated Jul. 4, 2006.

English translation of Chinese Office Action for Chinese Application No. 02819228.1 (PCT/FI02/00769), dated Jul. 4, 2006.

"PPP Extensible Authentication Protocol (EAP)" by L. Blunk et al, Network Working Group, Request for Comments: 2284, Mar. 1998, pp. 1-15.

"Authentication and Key Generation for Mobile IP Using GSM Authentication and Roaming" by H. Haverinen, et al, 2001 IEEE, pp. 2453-2457.

"Use of GSM SIM Authentication in IEEE802.11 System" H. Haverinen et al, Submitted to IEEE802.11 TGe Jan. 2001, Slides 1-9.

* cited by examiner

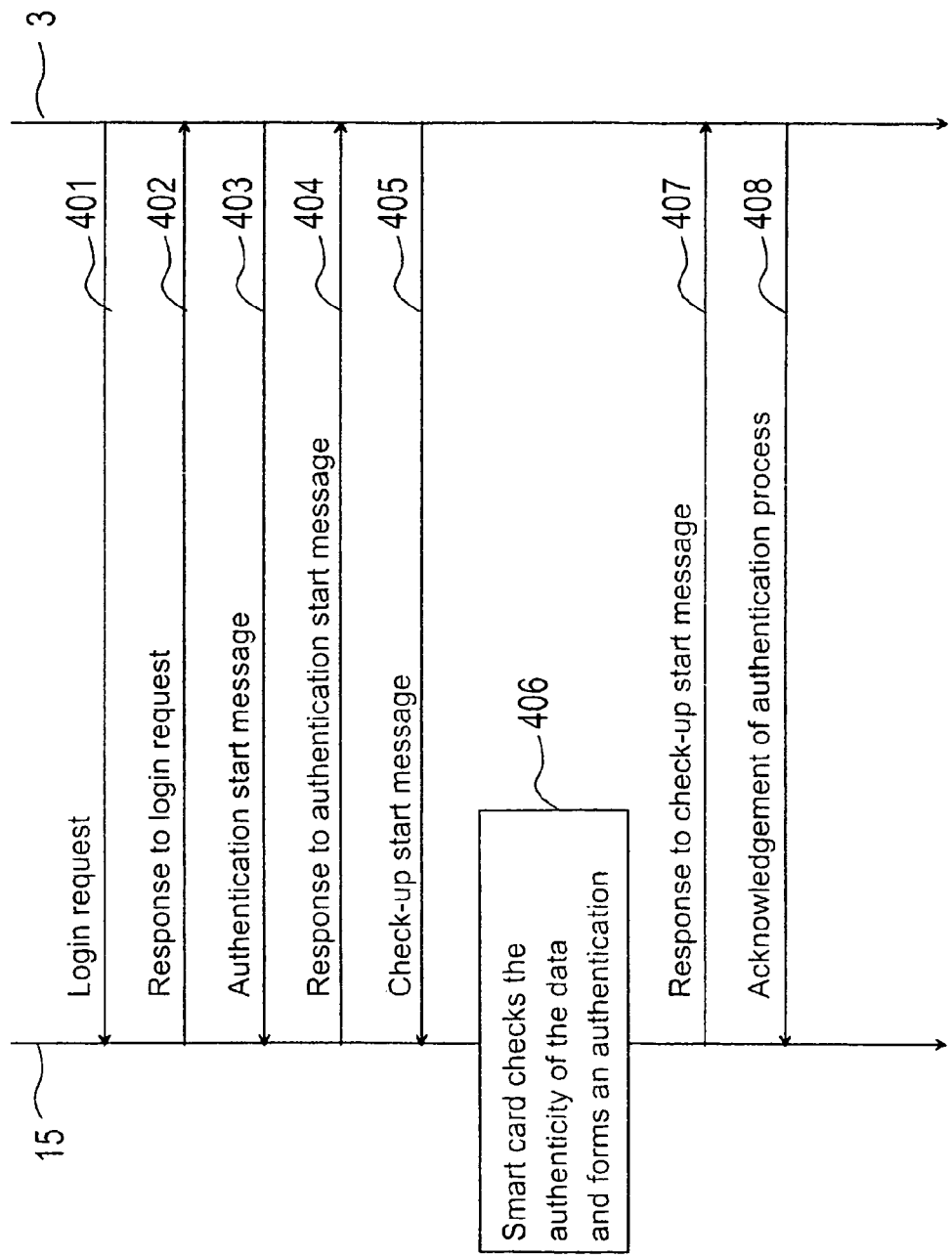

US 7,848,522 B2

METHOD FOR AUTHENTICATING A USER IN A TERMINAL, AN AUTHENTICATION SYSTEM, A TERMINAL, AND AN AUTHORIZATION DEVICE

CROSS-REFERENCE TO RELATED APPLICATIONS

This application is the U.S. National Stage of International Application Number PCT/FI02/00769 filed Sep. 27, 2002 (published in English Apr. 10, 2003) and which claims priority under 35 U.S.C. §119 to Finnish Patent Application No. 20011909 filed on Sep. 28, 2001.

The present invention relates to a method for authenticating the user of a terminal, the terminal applying an authorization device, and the authorization device being connected to the terminal. The invention also relates to an authentication system which comprises a terminal with means for coupling an authorization device at least for authentication, and the authorization device being equipped with means for implementing an authentication protocol. The invention also relates to a terminal with means for coupling an authorization device, at least for authentication, and the authorization device being equipped with means for implementing an authentication protocol. Furthermore, the invention relates to an authorization device, to be used for user authentication, the authorization device comprising means for implementing an authentication protocol. The invention further relates to a computer program comprising machine executable steps for authenticating the user of a terminal equipped with a device for verifying the rights to use, the device for verifying the rights to use being applied for running an authentication protocol, and to a storage medium for storing a computer program comprising machine executable steps for authenticating the user of a terminal equipped with a device for verifying the rights to use, the device for verifying the rights to use being applied for running an authentication protocol.

In this description, the authorization device refers to a functional device which has means for verifying the rights to use a function and/or a device before the device is operable and/or in connection with the use of the device. Such devices for verifying, to be mentioned in this context, include so-called smart cards which typically comprise a processor, a memory and connecting means. The smart card is provided with software or the like for processing inputs entered in the smart card and for generating responses. Such smart cards are used, for example, in mobile stations, as pay cards, as electronic identification cards, etc. Furthermore, there are known devices for verifying the rights to use, to prevent the use of copied software. Such a verifying device (called "dongle" or "hardlock") is placed, for example, in the printer connection of a computer, wherein the software includes a security program which investigates, for example, if the verifying device is coupled in the printer connection and, if necessary, it also examines the identification (e.g. a licence number) possibly stored in the verifying device. Although, below in this description, such devices for verifying the rights to use will be primarily called smart cards, it is obvious that the invention is not limited to be used in smart cards only.

Terminals are known, to which it is possible to connect a smart card to be used, for example, for user authentication. The authentication may be necessary e.g. to prevent unauthorized persons from using the terminal or performing such functions on the terminal which other persons than the authorized user of the terminal have no right to use. The authentication functions are normally arranged at least partly in connection with the smart card, wherein the terminal transmits the identification data entered by the user to the smart card. The identification data used is, for example, a user name and a password or a personal identity number (PIN). The smart card is provided with an authentication protocol which is run by applying, as authentication parameters, the identification data transmitted from the terminal. By means of the protocol, for example a reference number is computed, which is compared with the identity number stored on the smart card. Thus, when these numbers match, it is assumed that the user is the person he/she claims to be.

A smart-card based solution can also be used when the user is logged in a data network with a terminal. The data network is provided with an authentication server or the like, in connection with which are stored identification data of registered users, such as their name, user identification and password. Thus, the authentication server and the smart card communicate by means of the terminal and the data network. Also in such a solution, it may be necessary to identify the user first in connection with turning on of the terminal, after which a second authentication is performed in the authentication server of the data network. This second authentication is based on the use of a predetermined authentication protocol as well as authentication algorithms. Thus, the program codes necessary for running this authentication protocol are stored in the terminal and in the data network The authentication algorithm is stored in the authentication server as well as in the smart card.

In the data network, the authentication can be performed for example by sending a log-in request from the terminal to the data network, in which the log-in request is transmitted to the authentication server. The authentication server forms a challenge, or the like, by means of a predetermined authentication algorithm. After this, the authentication server transmits a log-in response message to the terminal in which said challenge is included either as such or in encrypted form. Further, the authentication of this message can be verified by a digital signature which the smart card can check after receiving the log-in response message. Next, the smart card produces a response number on the basis of the user identification data and the received challenge, by means of a predetermined authentication algorithm. The response number is transmitted to the authentication server which is capable of forming an expected number on the basis of the user identification data stored in the authentication server and the challenge formed by it. The authentication server can compare the received response number and the expected response number and, from the results of the comparison, deduce whether the data used in the formation of the received response number match with the data used in the formation of the expected response number. If the data match, it can be assumed that the user has been correctly authenticated and the user may start to use the data network. A method of the above-presented kind is used, for example, in the GSM mobile communication system and in the UMTS mobile communication system during login of a mobile station in the mobile communication network. The smart card used in the GSM mobile communication system and in the UMTS mobile communication system is the so-called SIM card (subscriber identity module) and the USIM card (UMTS subscriber identity module), respectively. As the authentication server, an authentication centre AuC is used. The SIM cards contain a mobile communication network operator specific authentication algorithm.

In smart-card based solutions, the user data and the authentication algorithm can be changed by replacing the smart card with a new smart card provided with a new authentication algorithm. In a corresponding manner, this new authentication algorithm must be installed in the authentication server, if it is not already installed.

A problem in the above-presented solutions of prior art is, inter alia, that the authentication protocol cannot be changed simply by changing the smart card. For example, different authentication protocols are used in GSM mobile communication systems and UMTS mobile communication systems, wherein a mobile communication device complying with the GSM mobile communication system cannot be updated to use an identification protocol used in the UMTS mobile communication system simply by changing the smart card. Thus, the changes in the authentication protocol also require changes at least in the terminal software and, if necessary, in the software of the authentication server.

The user of a mobile communication device may move within the range of different mobile communication networks. Thus, when the user is in another network than his/her home network, the authentication is performed in such a way that the roaming network transmits the messages according to the authentication protocol between the terminal and the authentication centre of the home network. The authentication is thus performed by the authentication centre of the home network. Thus, the authentication algorithm can be set to be operator-specific e.g. in GSM mobile communication systems and in UMTS mobile communication systems, because all the values to be used in the authentication are formed in the home network. The roaming network does not need to know the algorithm because its function is only to compare the figures. To maintain the operability of mobile communication devices in different mobile communication networks, the authentication protocol cannot be set to be operator-specific when using solutions of prior art.

Communication networks are also known, in which it is possible to couple a work station in a so-called home network, for example by means of an optional telephone network. Some of these so-called dial-up networks apply an extensible authentication protocol (EAP). In such systems, the purpose of the roaming network is only to transmit messages complying with the EAP protocol between the terminal and the authentication centre of the home network. The roaming network does not need to be capable of interpreting messages complying with the EAP protocol. A new authentication protocol or algorithm can be introduced without changing the roaming network at all. However, the terminal must be changed, because the software required by the new EAP protocol type must be updated in solutions of prior art.

The EAP is a standard defined by the Internet Engineering Task Force IETF for the extended authentication protocol to be used in connection with a point-to-point protocol (PPP), and its more specific definition is presented e.g. in the IETF document rfc2284.txt. The standard comprises the definitions for the structure of messages to be used for authentication. The EAP message comprises a header field and a data field. The header field defines, for example, the type, identification and length of the message. The messages are transmitted in message frames of the PPP protocol used-in the data link layer.

It is an aim of the present invention to provide an improved method for user authentication. The invention is based on the idea that a smart card is provided with an extensible authentication protocol interface (EAP IF), through which the authentication functions are performed on the smart card. To be more exact, the method according to the present invention is primarily characterized in that the authorization device applies an extensible authentication protocol interface, through which at least some of the authentication functions are implemented. The system according to the present invention is primarily characterized in that the authorization device is provided with an extensible authentication protocol interface as well as with means for implementing at least some of the authentication functions via said extensible authentication protocol interface. The terminal according to the present invention is primarily characterized in that the authorization device is provided with an extensible authentication protocol interface as well as with means for implementing at least some of the authentication functions via said extensible authentication protocol interface. Furthermore, the authorization device according to the present invention is primarily characterized in that the authorization device is provided with an extensible authentication protocol interface as well as with means for implementing at least some of the authentication functions via said extensible authentication protocol interface. The computer program according to the present invention is primarily characterized in that the computer program further comprises machine executable steps for applying an extensible authentication protocol interface in the device for verifying the rights to use, including machine executable steps for processing at least some of the authentication functions through the extensible authentication protocol interface. The storage medium according to the present invention is primarily characterized in that the computer program further comprises machine executable steps for applying an extensible authentication protocol interface in the device for verifying the rights to use, including machine executable steps for processing at least some of the authentication functions through the extensible authentication protocol interface. The authentication protocol interface to be used in connection with the present invention is extensible in the sense that any authentication protocol can be implemented by using said interface without changing the interface or the terminal software or the device in any way.

The present invention shows remarkable advantages compared to solutions of prior art. When applying the method according to the invention, the authentication protocol to be used for user authentication can be changed by changing the smart card. Thus, there is no need to update software in the roaming network or in the terminal. In this way, for example in mobile communication networks, the authentication protocol can be operator-specific, because the authentication centre of the home network is used as the authentication centre. Thus, a different authentication protocol may be used in the roaming network than in the user's home network. As there is no need to update software, the transmission of update files is avoided, which is complicated and difficult to control.

Figure 2:
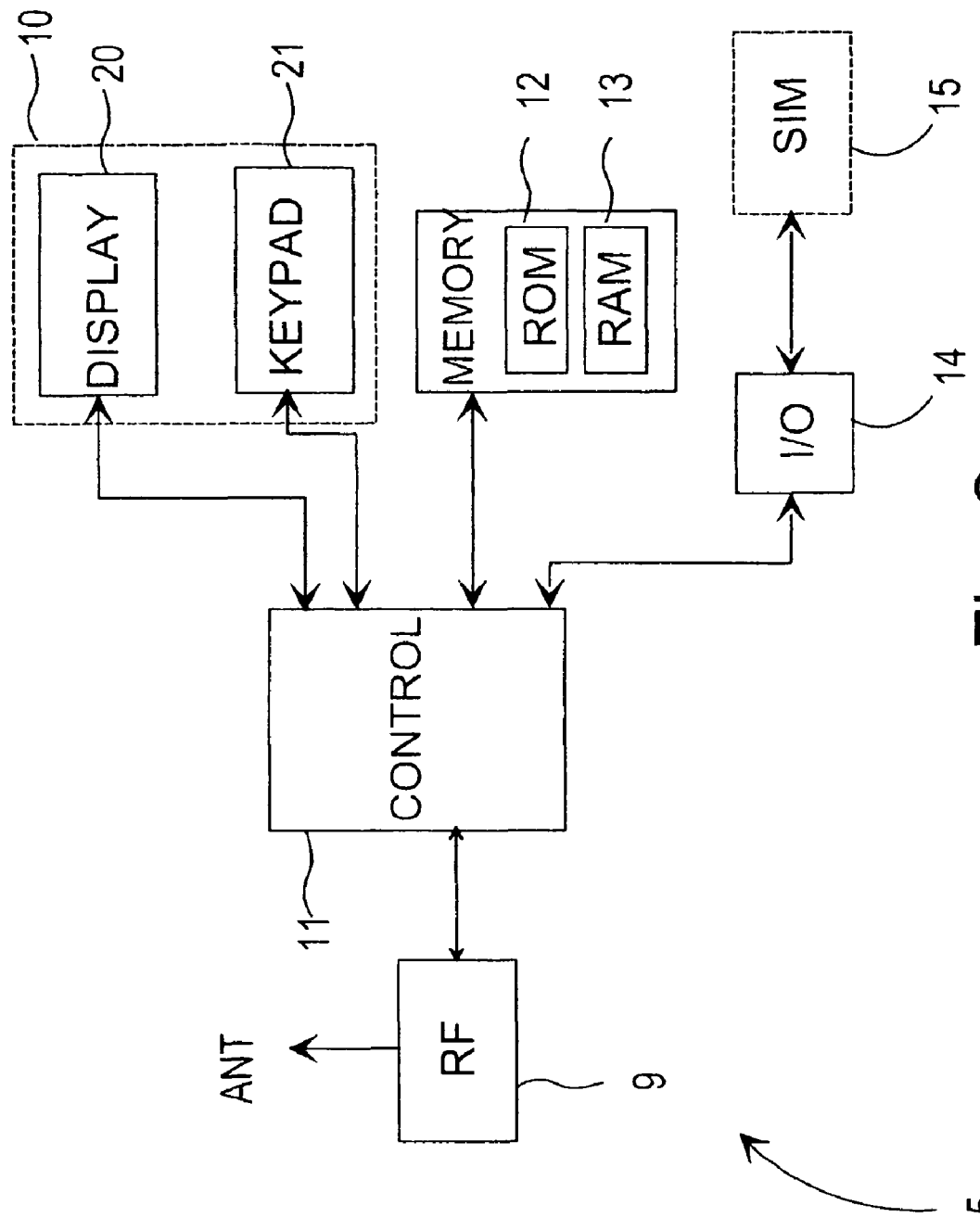
Figure 3:
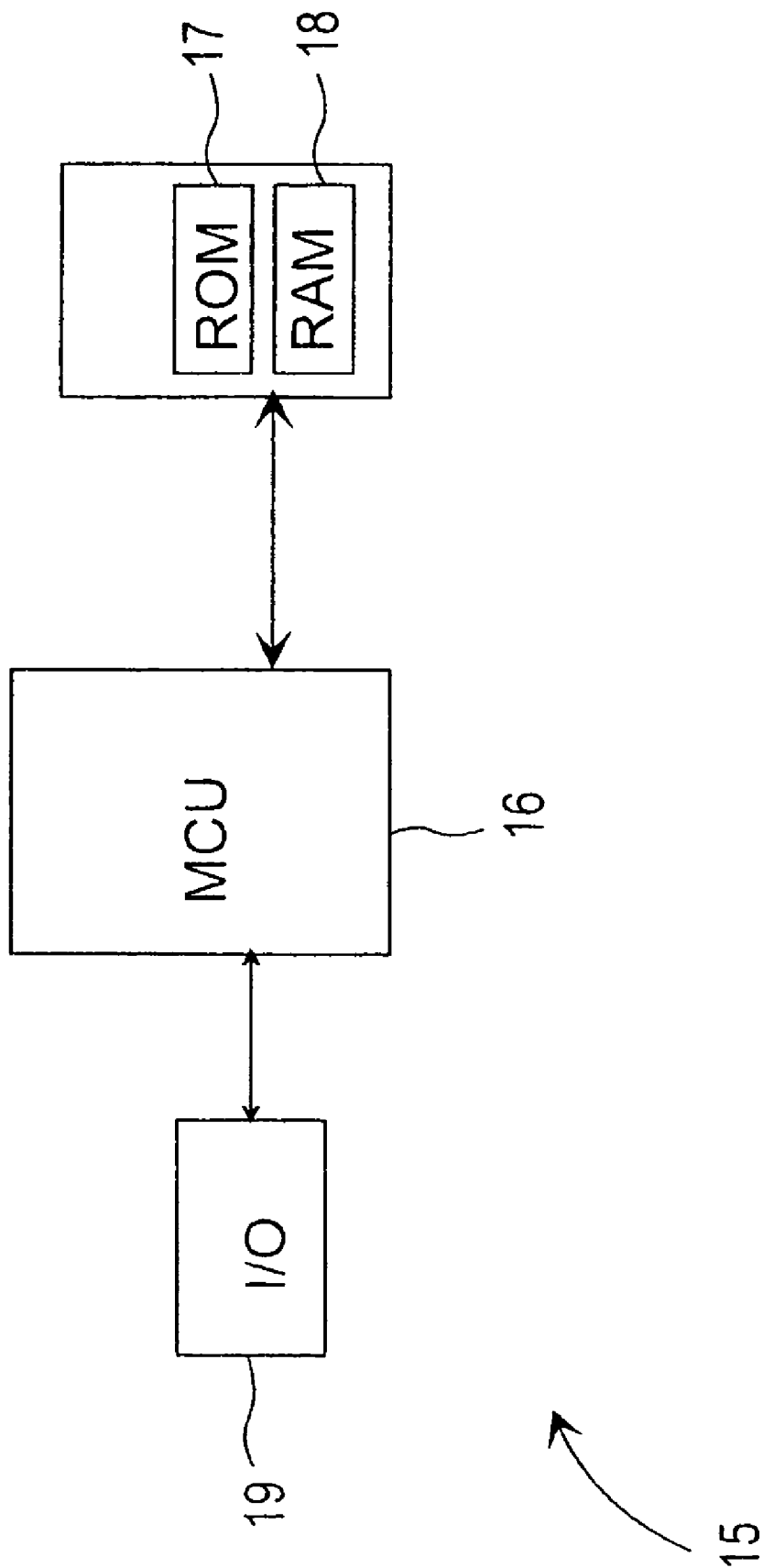

In the following, the invention will be described in more detail with reference to the appended drawings, in which FIG. 1 shows an authentication system according to a preferred embodiment of the invention in a reduced chart, FIG. 2 shows a wireless terminal according to a preferred embodiment of the invention in a reduced block chart, FIG. 3 shows a smart card according to a preferred embodiment of the invention in a reduced block chart, FIG. 4 shows the method according to a preferred embodiment of the invention in a signalling chart, and FIGS. 5*a* to 5*e* show some messages to be used in the system according to an advantageous embodiment of the invention.

In the following detailed description of the invention, the authentication system of a mobile communication network 2 is used as an example of an authentication system 1, but the invention is not limited to be used solely in connection with mobile communication networks. The mobile communication network 2 is, for example, a GSM mobile communication system or a UMTS mobile communication system, but it is obvious that the invention can also be used in other communication systems.

The present invention can also be applied in connection with UMTS-SIP authentication which applies a protocol complying with the EAP standard, as well as in systems applying the IEEE 802.1X authentication protocol. Said protocol is also being introduced in wireless local area networks (WLAN), and it is based on the application of a protocol complying with the EAP standard.

The authentication system comprises an authentication server 3, such as an authentication centre AuC for a mobile communication network. The authentication system also comprises communication means 4 for transmitting the data required in the authentication between the terminal 5 and the authentication server 3. The communication means comprise, for example, base stations 6, base station controllers 7 as well as one or more mobile switching centres 8 in a mobile communication network 2. The authentication server 3 can be a separate server connected to the mobile communication network 2, or it can be arranged e.g. in connection with the mobile switching centre B.

FIG. 2 shows a terminal 5 which complies with an advantageous embodiment of the invention and which can be used in the authentication system of FIG. 1. In this advantageous embodiment of the invention, the terminal 5 comprises e.g. mobile communication means 9 for communication with the mobile communication network 2, a user interface 10, a control block 11, memory means 12, 13, as well as connection means 14 for connecting a smart card 15 to the terminal 5. The memory means preferably comprise a read only memory (ROM) 12 as well as a random access memory (RAM) 13. The connecting means 14 for connecting the smart card 15 can be, in practice, implemented in a variety of ways. One possibility is to use a physical connection, wherein the connecting means 14 comprise connectors or the like which are coupled to corresponding connectors in the smart card 15 when the smart card 15 is installed in the terminal 5. These connecting means can also be based on a wireless connection, wherein the connecting means 14 and the smart card 15 comprise wireless communication means (not shown), such as radio communication means (e.g. Bluetooth™, WLAN), optical communication means (e.g. infrared), acoustic communication means, and/or inductive communication means.

In the terminal 5, preferably in the software of the control block 11, there is also implemented a protocol stack for making the necessary protocol conversions when messages are being transmitted from the mobile communication network 2 to the terminal 5 and from the terminal 5 to the mobile communication network 2.

FIG. 3 shows a smart card 15 which complies with an advantageous embodiment of the invention and which can be used e.g. in connection with the terminal 5 shown in FIG. 2. The smart card 15 preferably comprises e.g. a processor 16, memory means, such as a read-only memory 17 and a random access memory 18, as well as connecting means 19.

As the read-only memory 12, 17 it is possible to use, for example, a one time programmable ROM (OTP-ROM; programmable ROM or PROM) or an electrically erasable programmable ROM (EEPROM; Flash). Also, a so-called non-volatile RAM can be used as the readonly memory. As the random access memory 13, 18, it is preferable to use a dynamic random access memory (DRAM) and/or a static random access memory (SRAM).

For example, the user authentication algorithm to be run when the terminal is turned on, as well as the terminal user authentication algorithm to be run during its login in the mobile communication network 2, are stored in the read-only memory 17 of the smart card. Furthermore, the read-only memory 17 of the smart card contains stored functions of the extensible authentication protocol interface which will be described below in this description. Furthermore, in a way known as such, the read-only memory 17 of the smart card contains other program commands which are necessary for controlling the functions of the smart card.

In a corresponding manner, the read-only memory 12 of the terminal contains stored program commands required for controlling the functions of the terminal 5, program commands required for communication between the smart card 15 and the terminal 5, program commands required in connection with mobile communication functions, control commands of the user interface, etc.

However, it is not necessary to store authentication protocol functions in the terminal 5, because in the system of the present invention, these functions are performed in the extensible authentication protocol interface implemented on the smart card.

In the extensible authentication protocol interface presented in this invention, it is possible, for example, to implement an operation by which the smart card is requested for the user identification, as well as an operation by which a request message, such as an EAP request, can be entered in the smart card. Thus, the function of the smart card is to form a response (e.g. an EAP response) to this message. The terminal and the roaming network can be implemented in such a way that it is possible to carry out more than one exchange of request and response messages before the authentication result is found out. Furthermore, the smart card preferably contains an operation by which key material formed in connection with the authentication can be provided for use by the terminal. After this, the key material can be used for encryption of information to be transmitted, for example, via the radio channel, which is presently used in e.g. the GSM and UMTS mobile communication networks.

At the stage when the terminal 5 is turned on, it is possible to perform user verification, known as such, for example so that the terminal 5 displays, on the display 20 of the user interface 10, a notice where the user is requested to enter a personal identity number (PIN). After this, the user enters, e.g. with the keypad 21 of the user interface 10, his/her password which is transmitted by the terminal control block 11 to the smart card 15. On the smart card 15, the processor 16 checks up the password in a way known as such, by means of user data and an algorithm arranged for the checking, which have been stored in the readonly memory 17 of the smart card. If the password was correctly entered, the terminal 5 can be turned on.

Figure 5A:
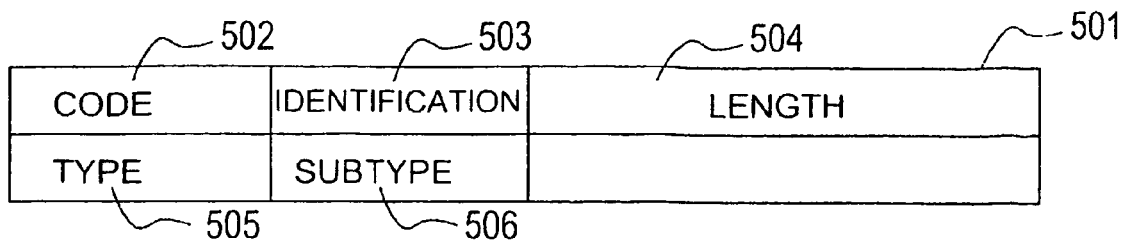
Figure 5B:
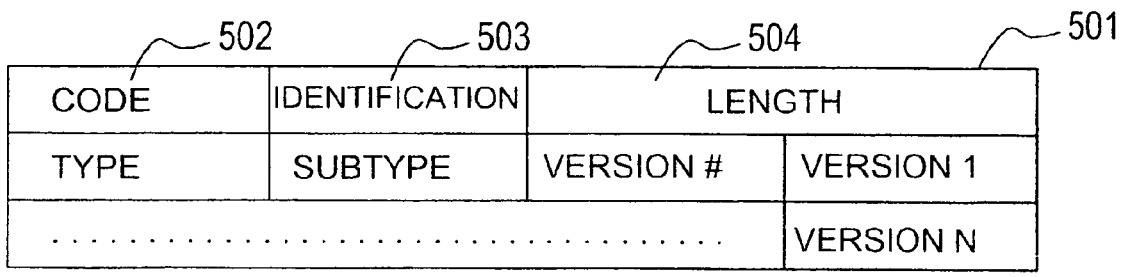
Figure 5C:
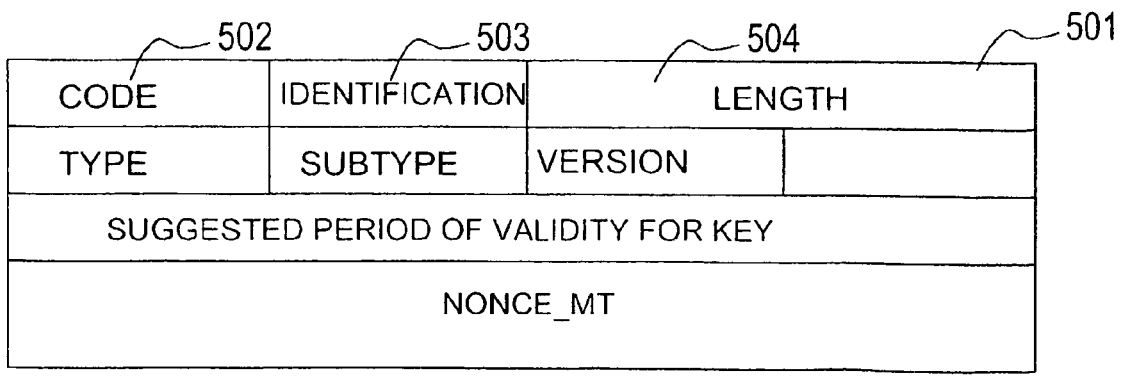
Figure 5D:
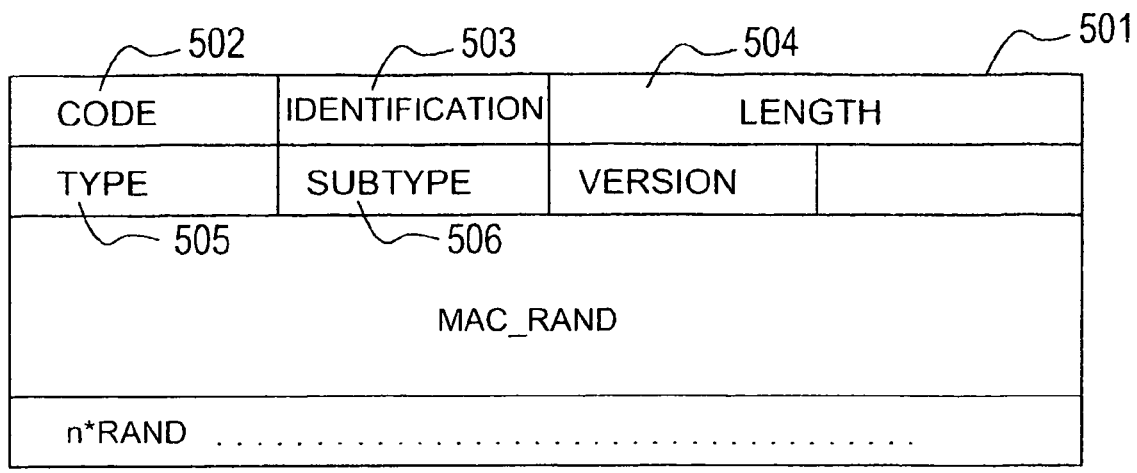
Figure 5E:
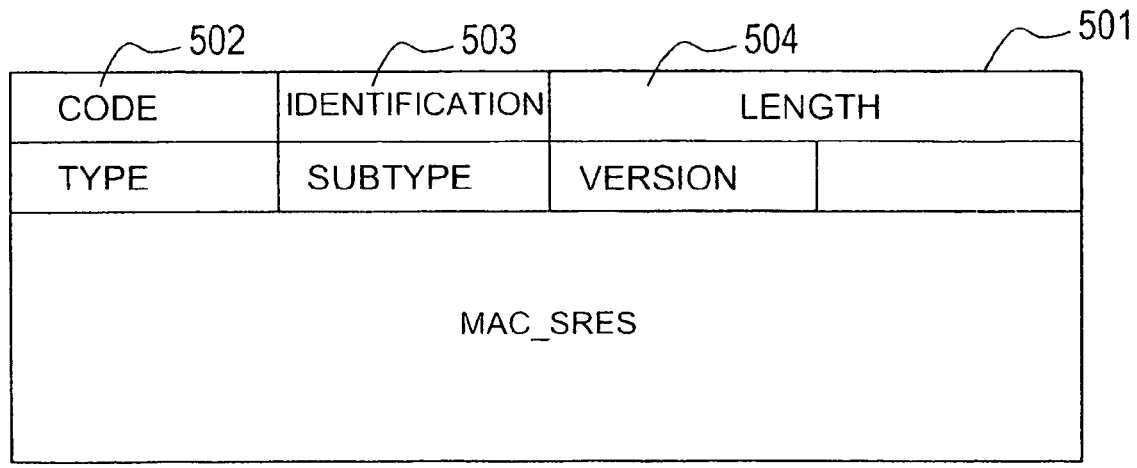

After the turning on, it is possible to start login in the network, if the signal of a base station 6 in the mobile communication network 2 can be received in the terminal 5. If it is possible to log in the network, the transmission of messages (signalling) required for login is started, which is known as such. During the login, a location update (LA) is performed, if necessary. Furthermore, in the login process, a transmission channel and a receiving radio channel are allocated for signalling, to be used by the terminal and the base station in the communication. In connection with the login, the terminal is authenticated, which is shown in a reduced manner in the signalling chart of FIG. 4. The authentication server 3 of the mobile communication network 2 generates a login request 501, of which an advantageous example is shown in FIG. 5*a*.

The login request is preferably a message which complies with the extensible authentication protocol and comprises certain records containing values which can be changed to form several different messages, using substantially the same record structure. The message preferably comprises a header field and a data field. The header field contains, inter alia, the following data records: a code record 502 for transmitting information about whether the message is a request, a response, a success or a failure; an identification record 503 which is used for identifying the messages e.g. in such a way that successive messages should contain different identification data, except when the same message is retransmitted; furthermore, a length record 504 indicates the length of the message. The data to be transmitted in the data field depends, for example, on the purpose of use of the message. In the system according to an advantageous embodiment of the present invention, the data field contains a type data record 505 which indicates the type of the message in question. For example, on the basis of the EAP type number, the terminal 15 can determine which smart card 15 or program module will process the EAP type (or authentication protocol) in question. The other data records contained in the message are: type-specific and may contain, for example, data which are specific to the authentication protocol used, such as various challenges, responses, digital signatures or verifications, message authentication codes, etc.

With the login request, the authentication server 3 requests the terminal 5 to transmit its own identification data. The transmission of the login request is indicated by arrow 401 in FIG. 4. The mobile communication means 9 of the terminal 5 perform the necessary operations to convert radio-frequency signals to baseband signals in a way known as such. The login request is transmitted in the terminal 5 to the smart card 15, in which the message is processed in the extensible authentication protocol interface. In practice, this means that the processor 16 of the smart card receives the login request and runs the necessary operations. The processor 16 of the smart card generates a response in which the data field contains identification data of the user of the terminal, preferably an international mobile subscriber identifier (IMSI). This international mobile subscriber identifier contains a mobile country code (MCC), a mobile network code (MNC) as well as a mobile subscriber identification number (MSIN). In each SIM-type smart card 15, this identifier IMSI is unique, wherein the mobile subscriber can be identified on the basis of this identifier data.

In a case complying with the EAP standard, the identifier is transmitted in an EAP response/identity packet, in which the identity in the roaming network is a so-called network access identifier (NAI). In an advantageous embodiment of the invention, the user identifier (e.g. IMSI) is transmitted in encoded format in this network identifier. In a general case, the network identifier is a character sequence which identifies the subscriber. It may contain an operator identifier, wherein it is in a form resembling an e-mail address: user identifier @operator.countrycode.

After the reply message has been formed in the smart card 15, the smart card 15 transmits this message via the smart card connecting means 19 to the terminal connecting means 14. The terminal control block 11 reads the message, makes the necessary protocol conversions, and transmits the message to the mobile communication means 9, to be converted to radio-frequency signals. The terminal 5 can now transmit a login request to the base station 6 (arrow 402). The login request is received at the base station 6, from which it is transferred via the base station controller 7 to the mobile switching centre 8. The mobile switching centre 8 transmits the message further to the authentication server 3. After this, the message is examined in the authentication server 3.

In the mobile communication network, the response is transmitted to the respective user's home network, in which the authentication server 3 processes the received response and checks the subscriber data e.g. from a home location register HLR. After the user's subscriber data have been checked from a database, the user authentication process is started, to verify that the user is really the person whose subscriber data are given in the response. The authentication server 3 continues the authentication process by forming an authentication start message, whose data field contains transmitted information, for example, about the protocol versions supported by the authentication server 3 (arrow 403). An advantageous form of this message is shown in the appended FIG. 5b.

In the terminal 5, the message is transmitted to the extensible authentication protocol interface of the smart card 15 where, for example, the protocol version data transmitted in the message are examined. If one or several protocols available at the authentication server 3 are also available on the smart card 15, one of these protocols is selected in the smart card 15 to be used in further steps of the authentication process. Furthermore, this protocol may also define the authentication algorithm to be used for authentication.

It is obvious that the above-presented transmission of messages is only one example of how the present invention can be applied. The number of messages processed by the smart card 15 may be different from that given in the presented example. In a general case, various requests (e.g. an EAP request) are transmitted from the communication network to the terminal 5 and guided by the software of the terminal 5 to the smart card 15. The smart card 15 generates responses (e.g. an EAP response) which the terminal 5 transmits to the roaming network and from there further to the authentication server 3 of the home network. The number of these requests and responses is not limited, and they only need to be intelligible to the smart card 15 and the authentication server 3.

In general, authentication protocols are based on the rule that the authenticating device and the device to be authenticated apply the same authentication algorithm in which the same figures are used as inputs. For example, in the GSM mobile communication system, each mobile subscriber is allocated a secret key Ki which is stored on the SIM card. Furthermore, this secret key is stored in the home location register of the mobile subscriber. The authentication algorithm computes a response number, wherein by comparing the response numbers formed by the authenticating device and the device to be authenticated, it is possible to authenticate the other party with a high probability. To reduce the possibility of misuse to a minimum, all the figures to be input in the authentication algorithm are not transmitted between the devices but they are stored in the device and/or in a database where they can be retrieved by the device. In particular, said secret key is not transmitted at any stage in the mobile communication network. In this method according to an advantageous embodiment of the invention, the following steps are taken.

The smart card 15 selects a first random number NONCE_MT by any method. Furthermore, a period of validity can be selected for the key to be defined in the authentication process. Information about the selected authentication protocol, said first random number NONCE_MT as well as the period of validity which was possibly selected are transmitted in a login response to the authentication server 3 by applying the above-presented message transmission mechanisms (arrow 404). An advantageous form of this message is shown in the appended FIG. 5c.

The authentication server 3 retrieves n number (n≧1) of GSM triplets, each triplet comprising a second random number RAND, a signed response SRES and an encryption key Kc from the home location register HLR. The authentication server 3 retrieves the GSM triplets from the home location register HLR using the GSM roaming network and the Mobile Application Part (MAP) protocol, as known in the prior art. Furthermore, using one or several authentication algorithms corresponding to the selected authentication protocol, the authentication server 3 computes a session key K as well as a first authentication code MAC_RAND. The parameters used in this computation are preferably the encryption key n*Kc, the random numbers n*RAND, the international mobile subscriber identifier IMSI, and the first random number NONCE_MT. For the key, the authentication server 3 may accept the period of validity suggested by the smart card 15, or it may select another period of validity. In a check-up start message to the terminal 5, the authentication server 3 transmits one or more random numbers n*RAND selected by it, the first authentication code MAC_RAND computed by it, as well as data about the period of validity selected for the key (arrow 405). An advantageous form of this message is shown in the appended FIG. 5d.

In the extensible authentication protocol interface of the smart card 15 of the terminal 5, the same authentication algorithm is run in a corresponding manner, using as the parameters the first random number NONCE_ME selected by the smart card 15, a given number of encryption keys n*Kc, second random numbers n*RAND selected by the authentication server 3, as well as the international mobile subscriber identifier IMSI (block 406). The result of the authentication algorithm is compared with the first authentication code MAC_RAND computed in the authentication server 3 and transmitted to the smart card 15. If the comparison shows that the result of the computation of the authentication algorithm is the same on the smart card 15 and in the authentication server 3, it can be assumed on the smart card that the check-up start message transmitted by the authentication server was really transmitted by said authentication server 3 and that the random numbers in it are reliable. If the comparison shows that the computed numbers do not match, the authentication functions are preferably stopped on the smart card 15 and the terminal 5 is not registered in the mobile communication network, or in case of an authentication to be made in connection with the use of a service, the use of the service is prevented.

In a situation in which the comparison shows that the random numbers are reliable, the smart card 15 forms signed responses SRES. This is performed with an algorithm which corresponds to that in the authentication server 3, by using, as the pararmeters, the encryption keys n*Kc and the second random numbers n*RAND selected by the authentication server 3. The computed signed responses n*SRES as well as preferably the international mobile subscriber identifier IMSI and the first random number NONCE_MT can then be used for computing the second authentication code MAC_SRES with an algorithm. To the check-up start message, the smart card 15 forms a response which is transmitted to the authentication server 3 (arrow 407). In this response, the second authentication number MAC_SRES computed on the smart card is transmitted. An advantageous form of this message is shown in the appended FIG. 5b. The authentication server 3 can make a corresponding computation and compare the authentication number computed by it with the second authentication number MAC_SRES transmitted from the smart card 15. If the authentication numbers match, the authentication server 15 can assume that the user is really the person whose international mobile subscriber identifier was transmitted from the smart card 15 of the terminal to the authentication server 3. At the end of a successful authentication process, the authentication server 3 transmits information about this to the terminal 5 (arrow 408). In this same message, the authentication server 3 can also transmit a session key K to the terminal 5.

It is obvious that the above-presented authentication process and the structure and content of messages transmitted in connection with it are only some advantageous examples of the operation according to an authentication protocol (EAP/SIM). Within the scope of the present invention, it is also possible to use other message structures and authentication data, wherein the details may be different from those given in the example above. Neither is the invention limited solely to the extensible authentication protocol, but also other common authentication protocols can be applied in connection with the invention. What *is essential is that the smart card 15 is provided with an authentication protocol interface in which it is possible to process received messages related to the authentication, to form messages which are related to the authentication and which shall be transmitted to the authentication server 3, to process keys related to the authentication (e.g. to retrieve them from the read-only memory 17 of the smart card and/or from the received message), as well as to verify the messages related to the authentication. Thus, all the functions which are substantially related to the authentication in the terminal 5 can be placed on the smart card 15.

The method according to the invention can also be applied in a situation in which the terminal 5 is coupled, for example, to the Internet data network 22 and a SIM card is used for user identification. Thus, the authentication server can be placed, for example, in the interface between the Internet data network 22 and the mobile communication network, wherein the authentication server can communicate with the authentication centre AuC of the mobile communication network for retrieving the necessary authentication data. The PPP protocol is used between the terminal 5 and a so-called network access server (NAS). The network access server communicates with the authentication server by using the AAA protocol. In wireless local area networks, the situation is similar for the essential parts. Between the terminal and the access point of the wireless local area network, e.g. the IEEE 802.1X protocol is used, which is based on the use of the EAP protocol. The access point communicates with the authentication centre by using the AAA protocol.

By the method of the invention, the authentication protocol can be changed, for example, by changing the smart card 15. Thus, such a protocol can be used which is implemented on the new smart card 15 as well as in the authentication server. For example, no changes need to be made in the software of the terminal in connection with changing the authentication protocol.

As the terminal 5, it is possible to use, for example, a wireless terminal, such as a wireless communication device, such as Nokia 9210 Communicator; or the like. The invention can also be applied, for example, in the authentication of a work-station in a local area network, and in the authentication of a computer to be coupled to the Internet data network 22 either by a wired or wireless connection.

The invention can also be applied in such a way that the extensible authentication protocol interface of the device 15 for verifying the rights to use allocates some of the cryptographic computational operations to be carried out in the terminal 5. The cryptographic operations include, for example, encryption, decryption, hashing functions, message authentication code functions, checking of certificates, as well as other cryptographic operations related to the public key, such as the computing of Diffie-Hellman key exchange, etc. Some of these crypto-graphic operations require a large computation capacity which can, in some applications, be more easily arranged in the terminal 5 than in the device 15 for verifying the rights to use. Furthermore, such operations are basic cryptographic operations which are often implemented in universal libraries and do not necessarily require software updates in the terminal 5. It is thus possible to use various identifications, on the basis of which the device 15 for verifying the rights to use can inform the terminal 5 about the operation/algorithm to be used at a time and transmit the necessary parameters via the extensible authentication protocol interface to the terminal 5. The terminal 5, in turn, transmits responses to the extensible authentication protocol interface of the device 15 for verifying the rights to use.

The invention can also be implemented in software by making one or more computer programs, in which machine executable steps are defined for performing the different steps of the present invention. The computer program(s) can be stored on a storage medium for e.g. delivering the computer program(s) to users for installation of the computer-program(s) on the terminal 5 and/or on the device 15 for verifying the rights to use.

It is obvious that the present invention is not limited solely to the above-presented embodiments, but it can be modified within the scope of the appended claims.

The invention claimed is:

1. A method, comprising:
   receiving in a device a request from a terminal for authenticating a user of the terminal,
   performing authentication functions in said device to form a response to the request, and
   transmitting the response from the device to the terminal,
   wherein said device is installed in the terminal, and
   wherein at least some of the authentication functions are performed through an extensible authentication protocol interface of the device.

2. The method according to claim 1, further comprising:
   receiving a login request from the terminal, said login request being transmitted from a communication network to the terminal for verifying the user's rights to login to the communication network through the terminal,
   processing the login request in the extensible authentication protocol interface to form a reply message, and
   transmitting the reply message from the device to the terminal for authenticating the user with the communication network.

3. The method according to claim 1, wherein said request comprises information about the authentication protocol to be used for user authentication.

4. The method according to claim 3, wherein at least one authentication algorithm to be used for authentication according to an authentication protocol is stored in the device for authenticating the user.

5. The method according to claim 4, wherein identification data for identifying the user is stored in the device for verifying the user's rights to use the terminal, and wherein in processing the request, said at least one authentication algorithm and the identification data stored in the device are used for user authentication.

6. The method according to claim 1, wherein in processing the request, at least one cryptographic key is formed in the extensible authentication protocol interface, said at least one cryptographic key is transmitted from the device to the terminal.

7. The method according to claim 6, wherein said at least one cryptographic key is to be used for encryption of information to be transmitted between the terminal and a communication network.

8. A system, comprising a terminal and a device, said device being installed in the terminal, wherein said device is configured to:
   receive a request from the terminal for authenticating a user of the terminal,
   perform authentication functions to form a response to the request, and
   transmit the response from the device to the terminal,
   and wherein at least some of the authentication functions are performed via an extensible authentication protocol interface of the device.

9. The system according to claim 8, wherein the terminal is configured to:
   transmit a request to the device for authenticating the user, and
   receive the response from the device verifying the user's rights to use the terminal.

10. The system according to claim 8, wherein information about the authentication protocol to be used for user authentication is arranged to be transmitted in said request, and that at least one authentication algorithm to be used for authentication according to the authentication protocol is stored in the device.

11. The system according to claim 10, wherein identification data for identifying the user is stored in the device, and the device is configured to use said at least one authentication algorithm and the identification data stored in the device for verifying the user's rights to use the terminal.

12. The system according to claim 8, wherein the terminal comprises a communication element for transmitting information between the terminal and at least one communication network, wherein the extensible authentication protocol interface is configured to form at least one cryptographic key, and wherein said at least one cryptographic key is arranged to be transmitted from the device to the terminal.

13. The system according to claim 12, wherein the terminal is configured to use said at least one cryptographic key for encrypting information to be transmitted between the terminal and the communication network.

14. A terminal, comprising:
   an interface, configured to connect a device with the terminal, said device being installed in the terminal, and
   a communication element, configured to transmit a request to the device for authenticating a user of the terminal and to receive a response to the request from the device authenticating the user of the terminal,
   wherein said response is formed by said device performing authentication functions, and
   wherein at least some of the authentication functions are performed via an extensible authentication protocol interface of the device.

15. The terminal according to claim 14, further comprising a plurality of components for performing mobile station functions.

16. A device, comprising:
   a connection element for connecting the device with a terminal, said device being installed in the terminal, and
   a processor, configured to:
      receive a request from the terminal for authenticating a user of the terminal,
      performing authentication functions to form a response to the request, and
      transmit the response from the device to the terminal, wherein the processor comprises an extensible authentication protocol interface, and wherein at least some of the authentication functions are performed via said extensible authentication protocol interface.

17. The device according to claim 16, wherein it is a mobile subscriber identification card.

18. A computer program product comprising a non-transitory computer readable storage medium embodying computer program code thereon for use by a device, said device being installed in a terminal, wherein said program codes comprise:

instructions for receiving a request from the terminal for authenticating a user of the terminal, instructions for performing authentication functions in the device to form a response to the request, and instructions for transmitting the response from the device to the terminal, wherein at least some of the authentication functions are performed through an extensible authentication protocol interface of the device.

19. A computer program product comprising a non-transitory computer readable storage medium embodying computer program code thereon for use by a terminal, wherein said program codes comprise:

instructions for transmitting a request to a device for authenticating a user of the terminal, and instructions for receiving a response from the device authenticating the user of the terminal, wherein said device is installed in the terminal, wherein said response is formed by said device performing authentication functions, and wherein at least some of the authentication functions are performed via an extensible authentication protocol interface of the device.

* * * * *